(12) United States Patent
Moniot et al.

(10) Patent No.: US 7,275,077 B2
(45) Date of Patent: Sep. 25, 2007

(54) METHOD FOR ASSOCIATING A FIRST ADDRESS WITH A SECOND ADDRESS OF REDUCED SIZE FOR DIRECTLY ADDRESSING A CONTEXT MEMORY ON A COMPUTER

(75) Inventors: Pascal Moniot, Bernin (FR); David Furodet, Saint Martin d'Heres (FR)

(73) Assignee: STMicroelectronics S.A., Montrouge (FR)

( * ) Notice: Subject to any disclaimer, the term of this patent is extended or adjusted under 35 U.S.C. 154(b) by 759 days.

(21) Appl. No.: 10/395,041

(22) Filed: Mar. 21, 2003

(65) Prior Publication Data
US 2003/0225994 A1   Dec. 4, 2003

(30) Foreign Application Priority Data
Mar. 22, 2002   (FR)   ................................. 02 03626

(51) Int. Cl.
   *G06F 15/16*   (2006.01)
   *G06F 9/26*    (2006.01)
   *H04L 12/28*   (2006.01)
(52) U.S. Cl. ...................... 709/200; 711/216; 711/202; 370/389
(58) Field of Classification Search ...................... None
   See application file for complete search history.

(56) References Cited
U.S. PATENT DOCUMENTS

| | | | |
|---|---|---|---|
| 5,920,900 A | 7/1999 | Poole et al. | |
| 5,953,335 A | 9/1999 | Erimli et al. | |
| 5,999,441 A | 12/1999 | Runaldue et al. | |
| 6,034,958 A | 3/2000 | Wichlund | |
| 6,058,112 A | 5/2000 | Kerstein et al. | |
| 6,151,316 A | 11/2000 | Crayford et al. | |
| 6,157,623 A | 12/2000 | Kerstein | |
| 6,269,098 B1 | 7/2001 | Crayford | |
| 6,292,483 B1 | 9/2001 | Kerstein | |
| 6,438,674 B1* | 8/2002 | Perloff | 711/216 |
| 6,690,667 B1* | 2/2004 | Warren | 370/389 |

OTHER PUBLICATIONS

Preliminary Search Report from French Priority Application No. 02 03626, filed Mar. 22, 2002.

* cited by examiner

*Primary Examiner*—Wen-Tai Lin
(74) *Attorney, Agent, or Firm*—Lisa K. Jorgenson; James H. Morris; Wolf, Greenfield & Sacks, P.C.

(57) ABSTRACT

A method for associating with a first address a second address of reduced size, comprising: calculating a first intermediary address by the first address, the first intermediary address having a reduced size with respect to the first address; then choosing as a second address the first intermediary address if this second address is not associated with another first address, or, otherwise, calculating a second intermediary address by a first polynomial division of the first address, the second intermediary address having a reduced size as compared to the first address; then choosing as a second address the second intermediary address.

8 Claims, 5 Drawing Sheets

METHOD FOR ASSOCIATING A FIRST ADDRESS WITH A SECOND ADDRESS OF REDUCED SIZE FOR DIRECTLY ADDRESSING A CONTEXT MEMORY ON A COMPUTER

BACKGROUND OF THE INVENTION

1. Field of the Invention

The present invention relates to a method for reducing an address such as an Ethernet-type address, independently from the type (source or destination) of this address.

2. Discussion of the Related Art

In a communication system using the Ethernet protocol, several electronic devices such as computers can exchange data via a switching equipment such as an Ethernet switch or a "router".

Figure 1:
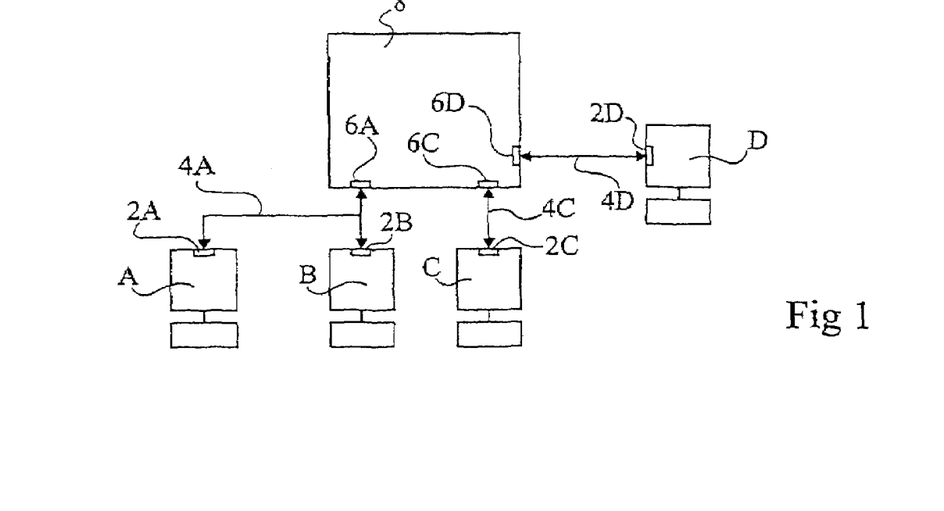
FIG. 1, previously described, schematically shows a conventional network communication system.

FIG. 1 schematically shows a communication system in which several devices A, B, C, and D are connected to form a local area network (LAN). Device A (typically a personal computer or a workstation) comprises an Ethernet interface 2A connected by a connection 4A to an Ethernet interface 6A of an Ethernet switching equipment (8). Device B comprises an Ethernet interface 2B also connected to Ethernet interface 6A of switching equipment 8. Device C comprises an Ethernet interface 2C connected to an Ethernet interface 6C of equipment 8 via a connection 4C. Similarly, an Ethernet interface 2D of device D is connected to an Ethernet interface 6D of equipment 8 via a connection 4D. Switching equipment 8 may be connected to a global network by an access not shown.

Devices A, B, C, and D may, provided to use the VLAN protocol, form virtual fields distinct from one another.

According to the Ethernet protocol, each device can be identified by an Ethernet address, called a MAC address.

Figure 2:
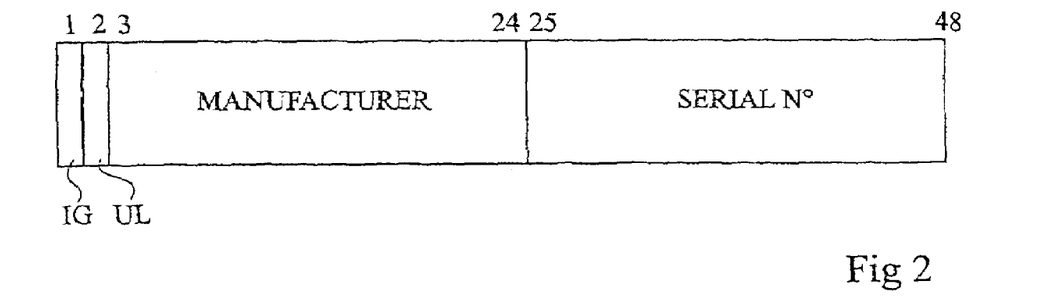
FIG. 2, previously described, illustrates the structure of a MAC address according to the Ethernet communication protocol.

FIG. 2 schematically shows the format of a MAC address. A MAC address is comprised of 48 bits. The first two bits, IG and UL, respectively indicate whether the address is an individual address or a group address and whether the address administration is local or global. The next 22 bits identify the manufacturer of the device to which the address is assigned, and the last 24 bits correspond to a serial number associated with the device.

The devices connected to the switching equipment communicate by exchanging data in data packets.

Figure 3:
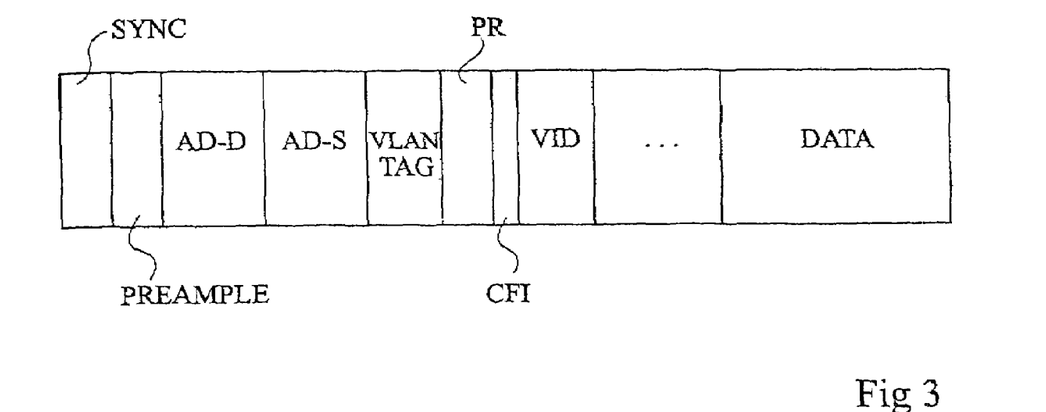
FIG. 3, previously described, illustrates the structure of a data packet according to the Ethernet communication protocol.

FIG. 3 shows the format of a data packet (referenced at the medium level) in accordance with the Ethernet protocol. The packet structure includes the following fields:

SYNC, comprising synchronization words;
PREAMBLE (8 bits), the preamble indicating the beginning of the data packet;
AD-D (48 bits), the destination address which is the MAC address of the device for which the data are intended;
AD-S (48 bits), source address AD-S which is the MAC address of the device sending the packet; and
when the packet is of VLAN type:
VLAN-TAG (16 bits), an optional field indicating that the corresponding packet conforms to the VLAN standard;
PR (3 bits) indicating, when the packet is of VLAN type, the priority level of the data packet and a field;
CFI (1 bit) (Canonical Field Information) specifying, when the packet is of VLAN type, whether the packet stands the source routing mode; and
VID (12 bits) when the packet is of VLAN type, indicating the number of the virtual field associated with the packet.

Only those elements constitutive of the packet which are necessary to the understanding of the present invention are referenced in this document.

It is considered, as an example, that device A sends a data packet to device C. When switching equipment 8 receives the data packet, equipment 8 searches the contexts associated with:

information couple AD-D (in this case, the address of equipment C) and VID (that of the packet).
information couple AD-S (in this case, the address of equipment A) and VID (that of the packet).

Note: if the packet received by equipment 8 has an invalid VID or if the packet is not of VLAN type, equipment 8 assigns a predetermined value to identifier VID.

The context data associated with the MAC addresses of the source and destination devices and with address VID each comprise information enabling processing of the data packet. For example, this information may indicate that device A is not allowed to provide data to device C over virtual address network VID. If allowed by the context data associated with the source and destination devices and with address VID of the data packet, the data packet is transmitted to device C by switching equipment 8.

In practice, a communication system is provided to operate with a maximum number of devices. Equipment 8 can store each possible MAC/VID address couple of the system in a content-addressable memory (CAM). This CAM memory also stores for each MAC/VID couple a connection identifier (or index) which will be used to extract the associated connection context stored in the context memory. Any received MAC/VID couple is then compared with each couple stored in the CAM memory. When a received MAC/VID couple is identical to a specific stored couple, the context datum is retrieved from the context memory by means of the index stored with the specific couple. As an example, for a maximum number of 512 devices that can be operated in the system, equipment 8 must store 512 couples of 60 bits (48 MAC address bits, 12 VID address bits), to which are added 9 index bits to address the 512 locations in the context memory, that is, a total 35,328 bits. Further, a content-addressable memory conventionally includes a line comparator. In the described example, 512 comparators are necessary and take up a significant surface area, which is not desirable.

To avoid using such a content-addressable memory, it could be devised to directly address the context memory with the received MAC/VID couples. Such a solution however implies the use of a context memory with 260 inputs, which is not a practical implementation.

SUMMARY OF THE INVENTION

An object of the present invention is to provide an address reduction method for associating with a received address an address of reduced size enabling pointing to a memory.

Another object of the present invention is to provide such a method enabling not using a large memory.

To achieve these and other objects, the present invention provides a method for associating with a first address a second address of reduced size, comprising the steps of:

a) calculating a first intermediary address by means of the first address, the first intermediary address having a reduced size with respect to the first address; then b) choosing as a second address the first intermediary address if this second address is not associated with another first address, or, otherwise, c) calculating a second intermediary address by a first polynomial division of the first address, the second intermediary address having a reduced size as compared to the first address; then d) choosing as a second address the second intermediary address.

According to an embodiment of the present invention, the method further comprises the steps of:

e) if the second address equal to the second intermediary address is associated with another first address, calculating a third intermediary address from a second polynomial division of the first address; and f) choosing as the second address the third intermediary address.

According to an embodiment of the present invention, the method further comprises the step of:

g) if the second address equal to the third intermediary address is associated with another first address, associating with the first address a second specific address chosen to be different from the first, second, and third intermediary addresses.

According to an embodiment of the present invention, when the intermediary address associated with the first address is equal to a second address associated with another first address, the method comprises the step of:

h) recalculating the second address associated with the other first address according to the steps that follow the step by means of which this second address has been calculated.

According to an embodiment of the present invention, step g/ comprises the steps of:

g1) comparing the first address with first addresses stored in a checking table, the checking table storing each first address for which is calculated a third intermediary address equal to a second address associated with another first address, and storing together the specific second addresses associated with the first stored addresses; and g2) if the first address is equal to a first stored address, providing the second specific address stored together with the first address.

According to an embodiment of the present invention, the first address comprises a device address, of a number n of bits, associated with a device, and a network address, of a number m of bits, and the method further comprises the step of:

i) comparing the network address with a predetermined group of accepted network addresses and, if the network address is an accepted network address, associating a network sub-address, of a number p of bits, with the network address, where number p is smaller than number m.

According to an embodiment of the present invention, the first intermediary address comprises a number q of bits, where number q is smaller than number n and greater than number p, and step a/ comprises the steps of:

a1) choosing for each bit of rank from 1 to p of the first intermediary address the result of an XOR operation on the bit of same rank of the device address and on the bit of same rank of the network sub-address;

a2) choosing for each bit of rank from p+1 to q−1 of the first intermediary address each bit of same rank of the device address; and a3) setting the bit of rank q of the first intermediary address to 0.

According to an embodiment of the present invention, the second intermediary address comprises a number q of bits, and step c/ comprises the steps of:

c1) performing a first division of the device address by a first polynomial defined by a number r of bits smaller than number n of bits of the device address and greater than number p of bits of the network sub-address;

c2) choosing for each bit of rank from 1 to p of the second intermediary address the result of an XOR operation on the bit of same rank of the remainder of the first division and on the bit of same rank of the network sub-address;

c3) choosing for each bit of rank from p+1 to q−1 of the second intermediary address the bit of same rank of the remainder of the first division; and c4) setting the bit of rank q of the second intermediary address to 0.

According to an embodiment of the present invention, the third intermediary address comprises a number q of bits, and step e/ comprises the steps of:

e1) performing a second division of the device address by a second polynomial defined by a number s of bits, where number s is smaller than number r and greater than number p;

e2) choosing for each bit of rank from 1 to p of the third intermediary address the result of an XOR operation on the bit of same rank of the remainder of the second division, and on the bit of same rank of the network sub-address;

e3) choosing for each bit of rank from p+1 to s of the third intermediary address the bit of same rank of the remainder of the second division; and e4) setting the bits of rank from s+1 to q−1 of the third intermediary address to 0, and the bit of rank q of the third intermediary address to 1.

According to an embodiment of the present invention, when the intermediary address associated with the first address is equal to a second address, a flag corresponding to the second address in an address table comprising a flag corresponding to each possible reduced address, is activated, the flags of the address table corresponding to the second addresses associated with a single first address being deactivated.

The foregoing objects, features and advantages of the present invention will be discussed in detail in the following non-limiting description of specific embodiments in connection with the accompanying drawings.

DETAILED DESCRIPTION

In the present invention, it is provided to associate with a first address an address of reduced size RAD by means of the calculation of one or several intermediary addresses.

A method according to the present invention for which the first address is formed of a MAC/VID address couple of 60 bits and in which address RAD associated therewith comprises 13 bits, will now be described.

First, a sub-address TVID is calculated from network address VID.

Figure 4:
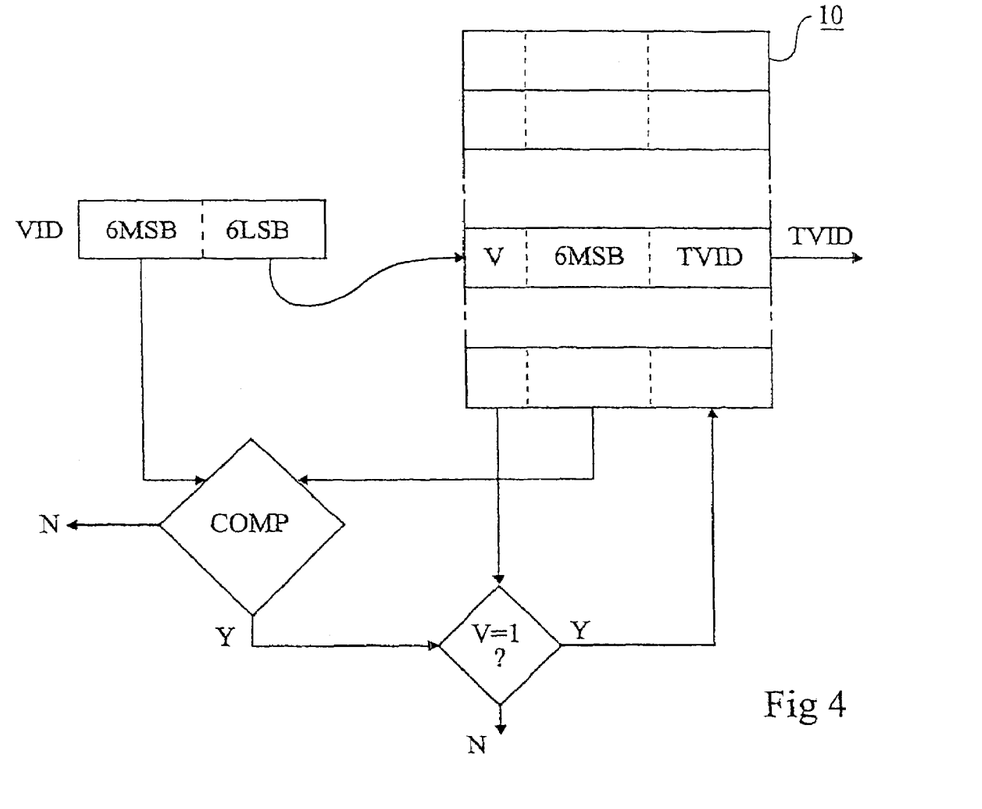
FIG. 4 illustrates the calculation of a TVID network sub-address based on a VID network address.

FIG. 4 illustrates the calculation of sub-address TVID based on address VID. Address VID is coded over 12 bits and can designate $2^{12}-1$ virtual networks (value 0 is unused). It is assumed that the considered communication network only uses a reduced maximum number of virtual networks equal to $2^5$. It is also assumed that the 6 least significant bits of each of the $2^5$ used VID addresses all code a different value. An address table of network 10 comprising $2^6$ locations is addressed by the 6 least significant bits 6LSB (of rank from 1 to 6) of the received VID address. Table 10 stores in each of its locations:

- a flag v validating the addressed memory. The flag of each location in table 10 is active if there exists a VID address accepted by the system, the 6 least significant bits of which address the location. The flag is otherwise inactive.
- 6 most significant bits 6MSB (of rank from 7 to 12) of the VID address, the 6 least significant bits of which address the location.
- an identifier, or sub-address, internal to the system, also called TVID, coded over 5 bits, uniquely associated with the VID address accepted by the system when the VID field is recognized.

Thus, the 6 least significant bits of any received VID address are used to address table 10. The 6 most significant bits stored in the addressed location are compared (COMP) with the 6 most significant bits of the received VID address. If the compared most significant bits are equal and if the flag of the addressed location is active (v=1), sub-address TVID stored in the addressed location is provided by table 10. If not, the received VID address is not recognized by the system and an error message is generated.

Figure 5:
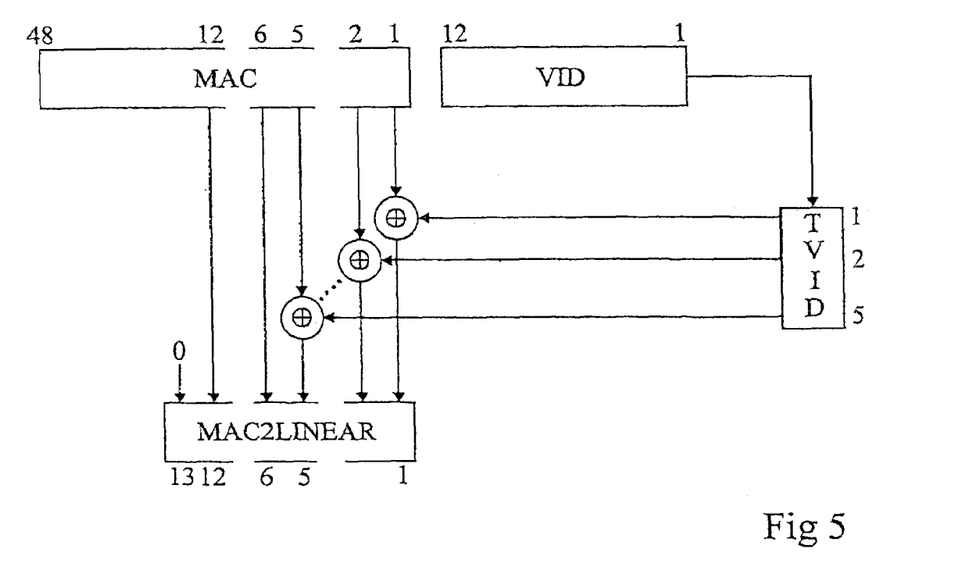
FIG. 5 illustrates the calculation of a first intermediary address according to the present invention.

FIG. 5 illustrates the calculation of a first 13-bit intermediary address MAC2LINEAR according to the present invention, for a received MAC/VID address couple. The VID address is processed as seen in relation with FIG. 4. It is assumed hereafter that the VID address of each received couple is accepted by the system and that a 5-bit sub-address TVID is provided by table 10 for each received MAC/VID couple. According to the present invention, the least significant bit (of rank 1) of first intermediary address MAC2LINEAR calculated for the received MAC/VID couple is equal to the result of an XOR operation on the bit of rank 1 of the received MAC address and on the bit of rank 1 of sub-address TVID. Similarly, the bits of rank 2 to 5 of the first intermediary address MAC2LINEAR calculated for the received MAC/VID couple are respectively equal to the result of an XOR operation on the bits of same rank (2 to 5) of the received MAC address and of sub-address TVID. According to the present invention, the bits of rank 6 to 12 of first intermediary address MAC2LINEAR are respectively equal to the bits of rank 6 to 12 of the received MAC address. The bit of rank 13 of first intermediary address MAC2LINEAR is chosen to be equal to 0.

According to the present invention, if first intermediary address MAC2LINEAR calculated for a received MAC/VID couple is different from the addresses of reduced size associated with the already received MAC/VID couples, first intermediary address MAC2LINEAR is chosen as being the address of reduced size RAD associated with the received MAC/VID couple.

If not, the present invention provides calculating a second intermediary address as the result modulo $2^{13}$ of the CRC32 calculated on address MAC2CRC32.

Figure 6:
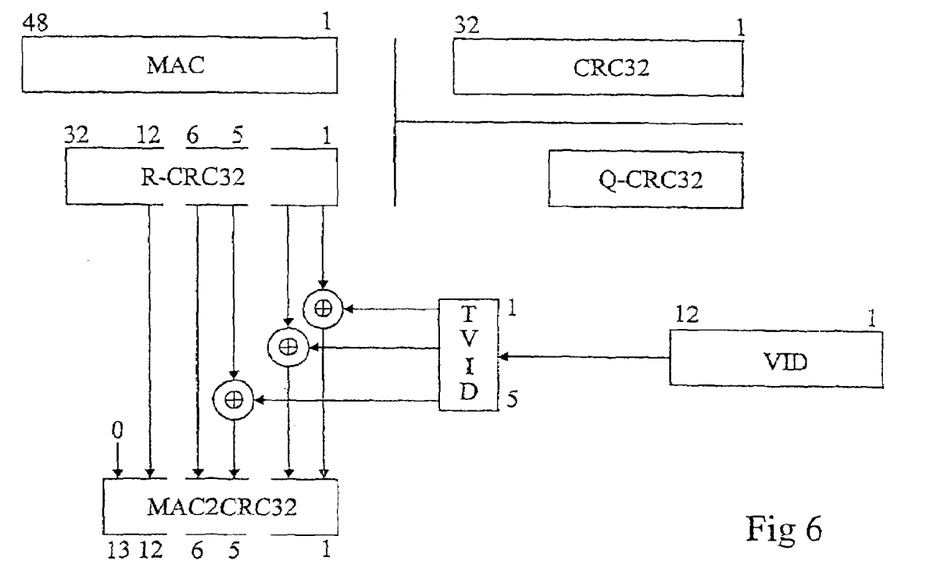
FIG. 6 illustrates the calculation of a second intermediary address according to the present invention.

FIG. 6 illustrates the calculation of a second intermediary address MAC2CRC32. The received 48-bit MAC address is divided by a cyclic redundant correction polynomial (CRC32) defined by 32 bits having hexadecimal value 0x04c11db7($X^{32}+X^0+X^1+X^2+X^4+X^5+X^7+X^8+X^{10}+X^{11}+X^{12}+X^{16}+X^{22}+X^{23}+X^{26}$). The result of the division provides a quotient Q_CRC32 and a remainder R_CRC32.

The five least significant bits (rank 1 to 5) of the second intermediary address MAC2CRC32 are each equal to the result of the XOR operation on the bits of same rank (1 to 5) of remainder R_CRC32 of the preceding polynomial division and of sub-address TVID. The bits of rank 6 to 12 of second intermediary address MAC2CRC32 are respectively equal to the bits of rank 6 to 12 of remainder R_CRC32. The bit of rank 13 of second intermediary address MAC2CRC32 is chosen to be equal to 0.

According to the present invention, if intermediary address MAC2CRC32 calculated for a received MAC/VID couple is different from the reduced addresses associated with the already received MAC/VID couples, then second intermediary address MAC2CRC32 is chosen as being the reduced address RAD associated with the received MAC/VID couple.

If not, the present invention provides calculating a third intermediary address MAC2CRC10 of 13 bits, of which only the 8 least significant bits vary, for the received MAC/VID couple.

Figure 7:
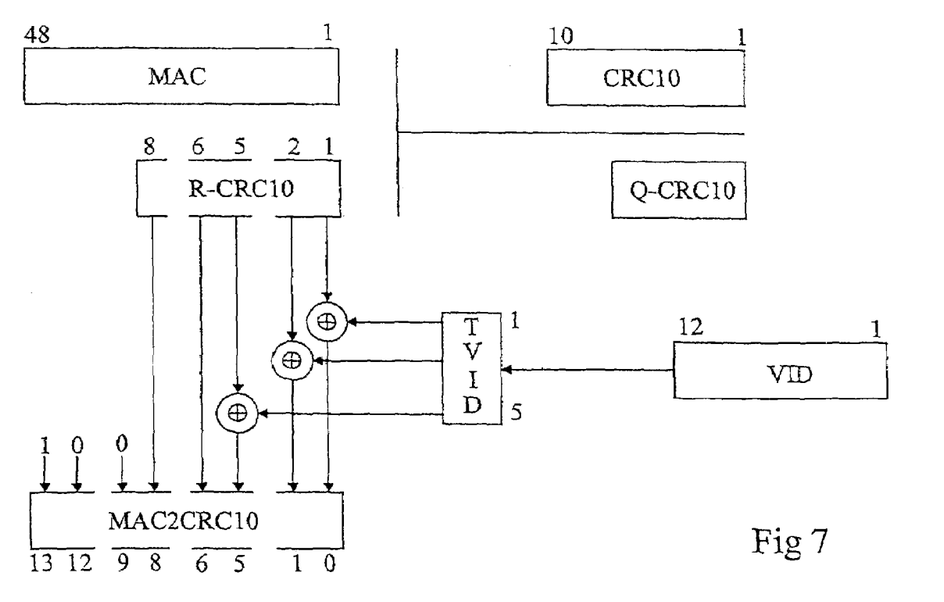
FIG. 7 illustrates the calculation of a third intermediary address according to the present invention.

FIG. 7 illustrates the calculation of a third intermediary address MAC2CRC10. The received 48-bit MAC address is divided modulo $2^8$ by a cyclic redundant correction polynomial (CRC10) defined by 10 bits, of hexadecimal value 0x633($X^{10}+X^9+X^5+X^4+X^1+X^0$). The result of the division provides a quotient Q_CRC10 and a remainder R_CRC10.

The five least significant bits (rank 1 to 5) of third intermediary address MAC2CRC10 are each equal to the result of an XOR operation on the bits of same rank (1 to 5) of remainder R_CRC10 of the preceding polynomial division and of sub-address TVID. The bits of rank 6 to 8 of third intermediary address MAC2CRC10 are respectively equal to the bits of rank 6 to 8 of remainder R_CRC10. The bits of rank 9 to 12 of third intermediary address MAC2CRC10 are chosen to be equal to 0. The bit of rank 13 of third intermediary address MAC2CRC10 is chosen to be equal to 1.

According to the present invention, if third intermediary address MAC2CRC10 calculated for a received MAC/VID couple is different from the reduced addresses associated with the already received MAC/VID couples, third intermediary address MAC2CRC10 is chosen as the reduced address RAD associated with the received MAC/VID couple.

If not, the present invention provides storing the received MAC/VID couple in a location of a checking table 12.

Figure 8:
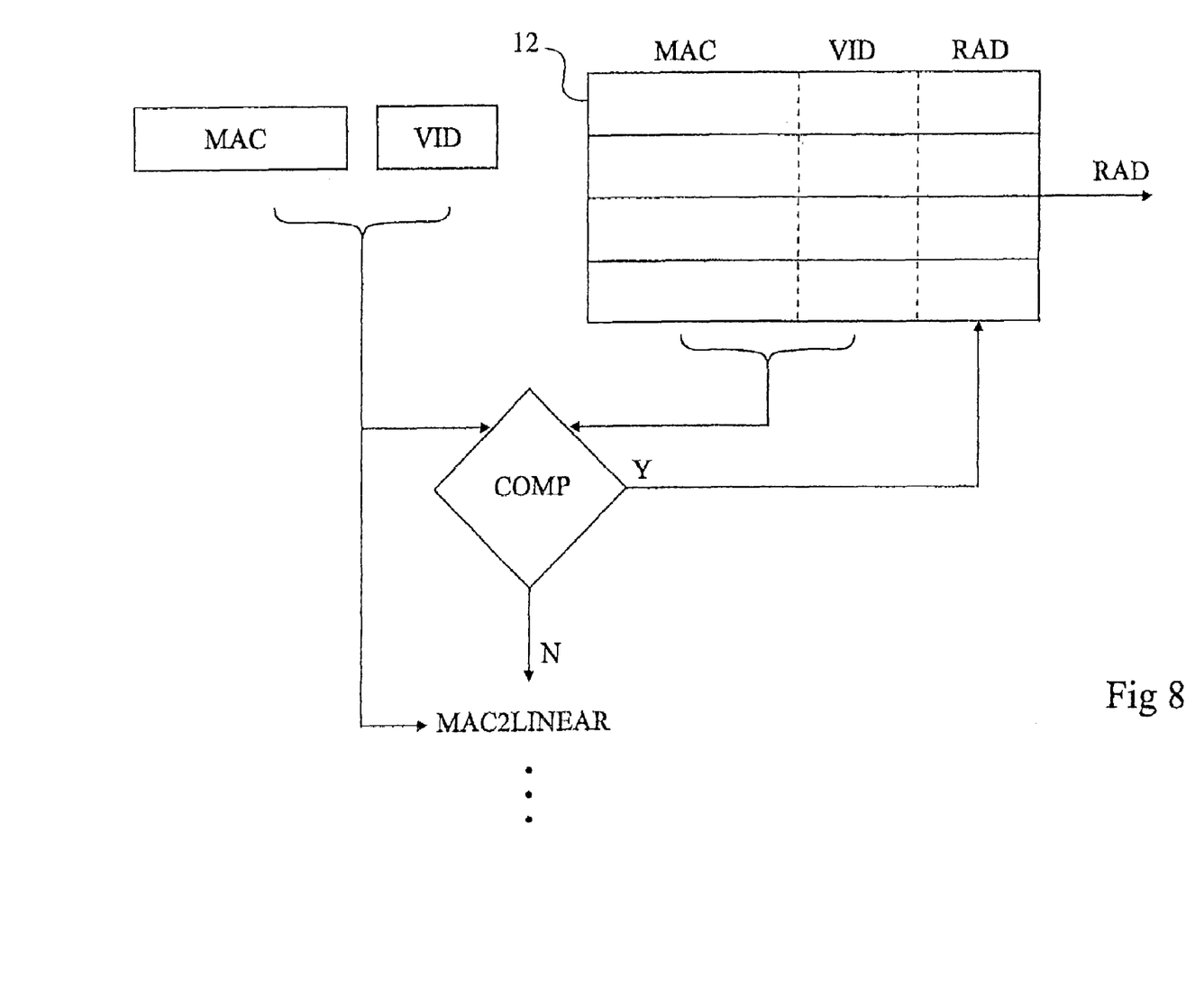
FIG. 8 illustrates the use of a checking table according to the present invention.

FIG. 8 illustrates the use of checking table 12. Each location of table 12 stores a MAC/VID couple, the third intermediary address MAC2CRC10 of which is equal to a reduced address associated with an already received MAC/VID couple. Each location in table 12 further stores a specific reduced address RAD provided to be different from the reduced addresses RAD calculated by means of intermediary addresses MAC2LINEAR, MAC2CRC32, MAC2CRC10.

Any received MAC/VID address couple is first compared (comp) with the couples stored in the locations of table 12. If the received MAC/VID couple is equal to a stored couple (Y), the specific address RAD stored in the table at the location corresponding to the MAC/VID couple is provided. Otherwise (N), the received MAC/VID couple is used to calculate the intermediary addresses (MAC2LINEAR, . . . ) as described previously. As an example, for a maximum number of 512 devices capable of being operated in a system, the applicant has determined that a checking table 12 comprising four locations would be enough to store all the MAC/VID address couples likely, at the end of the previously-discussed intermediary address calculation process, to provide third intermediary addresses MAC2CRC10 identical to an address RAD associated with an already received couple.

Figure 9:
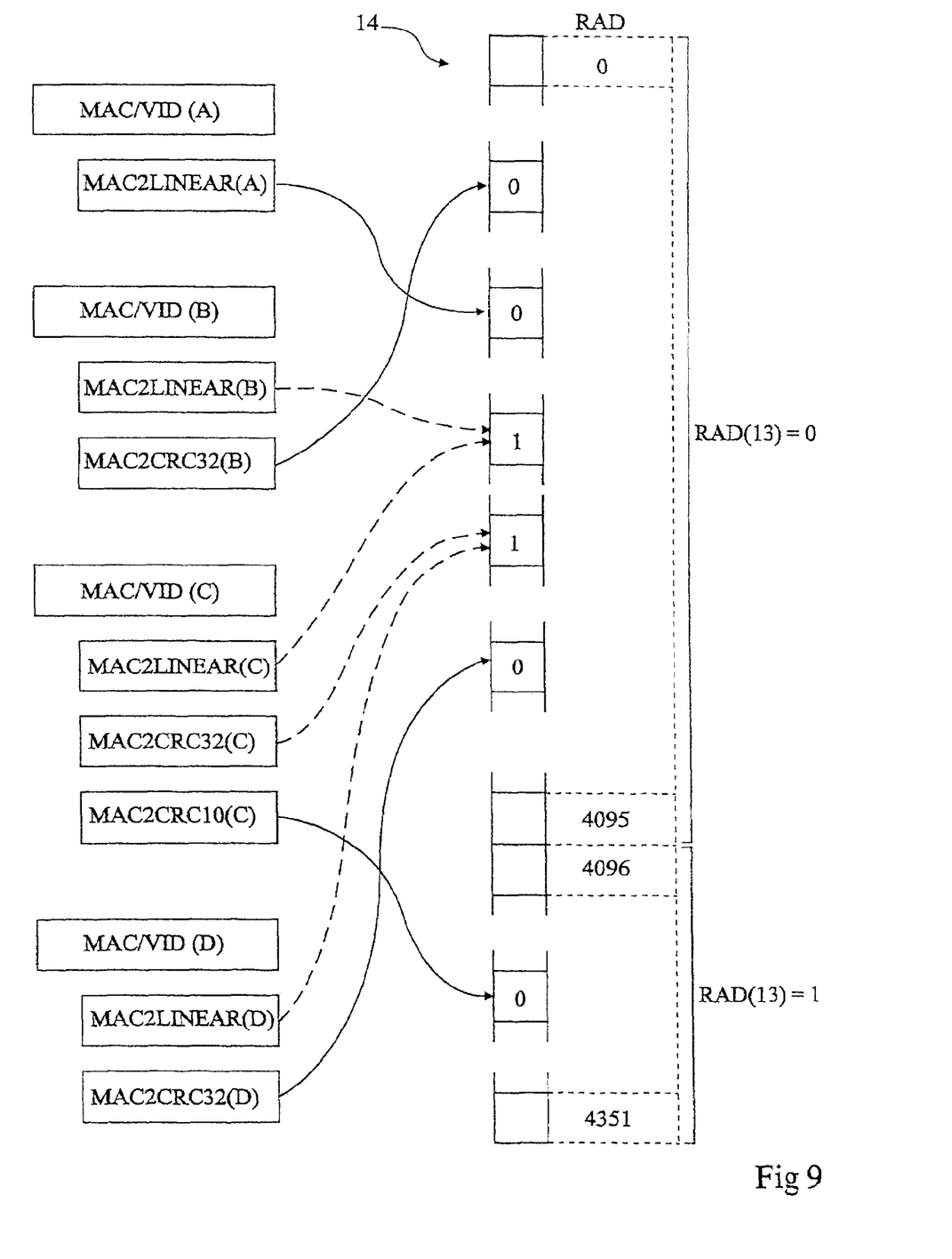
FIG. 9 illustrates an implementation of the present invention.

FIG. 9 illustrates an implementation of the present invention. An address table 14, directly addressable by the reduced address RAD associated with each received MAC/VID couple, comprises a flag in each line. The flag is active (equal to 1) if the address RAD addressing the line is equal to the intermediary addresses calculated for at least two received MAC/VID couples. In such a case, a new intermediary address is calculated as described previously for each of the MAC/VID couples. The flag is inactive (equal to 0) in the opposite case.

As an illustration, FIG. 9 shows an address couple MAC/VID(A) corresponding to a device A. The address RAD associated with couple MAC/VID(A) is assumed to be equal to first intermediary address MAC2LINEAR(A) calculated from couple MAC/VID(A). The flag of the line of table 14 having MAC2LINEAR(A) as an address is inactive.

A first intermediary address MAC2LINEAR(B) calculated from a couple MAC/VID(B) corresponding to a device B is equal to a first intermediary address MAC2LINEAR(C) calculated from a couple MAC/VID(C) corresponding to a device C. The flag of the line of table 14 having MAC2LINEAR(B) (or MAC2LINEAR(C)) as an address is active. The address RAD associated with couple MAC/VID(B) is then equal to the second intermediary address MAC2CRC32(B) calculated from couple MAC/VID(B). The flag of the line of table 14 having MAC2CRC32(B) as an address is inactive.

A first intermediary address MAC2LINEAR(D) calculated from MAC/VID(D) corresponding to a device D is equal to second intermediary address MAC2CRC32(C) calculated from couple MAC/VID(C). The flag of the line of table 14 having MAC2CRC32(C) (or MAC2LINEAR(D)) as an address is active. The address RAD associated with couple MAC/VID(C) is then equal to the third intermediary address MAC2CRC10(C) calculated from couple MAC/VID(C). The flag of the line of table 14 having MAC2CRC10(C) as an address is inactive. The address RAD associated with couple MAC/VID(D) is then equal to the second intermediary address MAC2CRC32(D) calculated from couple MAC/VID(D). The flag of the line of table 14 having MAC2CRC32(D) as an address is inactive.

According to an embodiment of the present invention, the generation method of address RAD is implemented in four phases:

Phase 1: does the MAC/VID couple belong to the table? If not, go to phase 2.

Phase 2: does the MAC/VID couple generate a single address MAC2LINEAR (the memory of table 14 comprises a flag at 0)? If so, this address is retained. If not, go to phase 3.

Phase 3: does the MAC/VID couple generate a single address MAC2CRC32 (the memory of table 14 comprises a flag at 0)? If so, this address is retained. If not, go to phase 4.

Phase 4: does the MAC/VID couple generate a single address MAC2CRC10 (the memory of table 14 comprises a flag at 0)? If so, this address is retained. If not, generate an error message.

The implementation of a method according to the present invention for the calculation and the association of an address RAD of 13 bits with a 60-bit MAC/VID address couple has many advantages. In the considered application, when the address RAD associated with a received MAC/VID couple is identified, the associated context datum is retrieved from a so-called context memory by means of an index stored at the position corresponding to the recognized address RAD. This context stores the corresponding MAC/VID element which acts as the last validity control of the RAD address. Indeed, the MAC/VID address of the received packet is then compared with the MAC/VID address of the context to finally validate address RAD. If the comparison fails, this means that there is a context duplication on the same RAD address, a maintenance process is then started to reconstruct the table by means of background task.

The size of the context memory is limited to the size of one context multiplied by the number of contexts required in the system. As an example, for a maximum number of 512 devices that can be operated in the system, a system according to the present invention can provide storing 512 13-bit reduced addresses (to which are added 9 bits to address the 512 context memory locations), that is, 10,752 bits. Further, the content-addressable memories or the comparators necessary to rapidly compare each 13-bit reduced address RAD associated with a received MAC/VID couple with the 512 stored RAD addresses take up a reduced surface area as compared to the 512 60-bit comparators necessary according to prior art.

Advantageously, a communication system using an implementation of the present invention may provide using the reduced address RAD associated with each possible MAC/VID address couple of the system to point to a context memory as described in the patent application Ser. No. 10/394,506, entitled "Method And Circuit For Providing A Context Datum Of A Device Based On An Address Associated With This Device", filed on even date herewith and incorporated herein by reference.

Of course, the present invention is likely to have various alterations, modifications, and improvements which will readily occur to those skilled in the art. In particular, the present invention has been described in relation with specific numerical values, especially as concerns the size of the received and provided addresses, but those skilled in the art will readily adapt the present invention to other numerical values.

Further, the present invention has been described in relation with a specific calculation mode of the intermediary addresses using an XOR operation with a network sub-address TVID, but those skilled in the art will readily adapt the present invention to a case where intermediary addresses MAC2LINEAR, MAC2CRC32, and MAC2CRC10 are calculated from the MAC address, remainder R_CRC32 and remainder R_CRC10 without using the XOR operation with network sub-address TVID.

The present invention has been described in relation with a communication system using a LAN network and exchanging data according to the Ethernet protocol, but those skilled in the art will readily adapt the present invention to any communication system using another type of network, for example, a global network of WAN type, or exchanging data according to a protocol other than the Ethernet protocol, requiring association with a first large address of a second reduced address.

The present invention could also, in an application to a communication system using the Ethernet protocol, be completed by a step for checking, for any received MAC address, whether this MAC address must be processed or not (reserved address), and whether this address must be processed in a specific manner (address of BROADCAST or UNICAST type).

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for associating, with a first address, a second address of reduced size for directly addressing a context memory on a computer, comprising:
   a) calculating a first intermediary address using a reduced number of bits of the first address, the first intermediary address having a reduced size with respect to the first address; then
   b) choosing as a second address the first intermediary address if this second address is not associated with another first address, or, otherwise,
   c) calculating a second intermediary address by a first polynomial division of the first address, the second intermediary address having a reduced size as compared to the first address; then
   d) choosing as a second address the second intermediary address;
   wherein the first address comprises a device address, of a number n of bits, associated with a device, and a network address, of a number m of bits, and further comprising the step of:
   i) comparing the network address with a predetermined group of accepted network addresses and, if the network address is an accepted network address, associating a network sub-address, of a number p of bits, with the network address, where number p is smaller than number m;
   wherein the first intermediary address comprises a number q of bits, where number q is smaller than number n and greater than number p, and step a) comprises the steps of:
   a1) choosing for each bit of rank from 1 to p of the first intermediary address the result of an XOR operation on the bit of same rank of the device address and on the bit of same rank of the network sub-address;
   a2) choosing for each bit of rank from p+1 to q−1 of the first intermediary address each bit of same rank of the device address; and
   a3) setting the bit of rank q of the first intermediary address to 0.

2. The method of claim 1, further comprising:
   e) if the second address equal to the second intermediary address is associated with another first address, calculating a third intermediary address from a second polynomial division of the first address; and
   f) choosing as the second address the third intermediary address.

3. The method of claim 2, further comprising:
   g) if the second address equal to the third intermediary address is associated with another first address, associating with the first address a second specific address chosen to be different from the first, second, and third intermediary addresses.

4. The method of claim 3 comprising, when the intermediary address associated with the first address is equal to a second address associated with another first address:
   h) recalculating the second address associated with the other first address.

5. The method of claim 4, wherein step g) comprises:
   g1) comparing the first address with first addresses stored in a checking table, the checking table storing each first address for which is calculated a third intermediary address equal to a second address associated with another first address, and storing together the specific second addresses associated with the first stored addresses; and
   g2) if the first address is equal to a first stored address, providing the second specific address stored together with the first address.

6. The method of claim 1, wherein the second intermediary address comprises a number q of bits, and step c) comprises:
   c1) performing a first division of the device address by a first polynomial defined by a number r of bits smaller than number n of bits of the device address and greater than number p of bits of the network sub-address;
   c2) choosing for each bit of rank from 1 to p of the second intermediary address the result of an XOR operation on the bit of same rank of the remainder of the first division and on the bit of same rank of the network sub-address;
   c3) choosing for each bit of rank from p+1 to q−1 of the second intermediary address the bit of same rank of the remainder of the first division; and
   c4) setting the bit of rank q of the second intermediary address to 0.

7. The method of claim 5, wherein the third intermediary address comprises a number q of bits, and step e) comprises:
   e1) performing a second division of the device address by a second polynomial defined by a number s of bits, where number s is smaller than number r and greater than number p;
   e2) choosing for each bit of rank from 1 to p of the third intermediary address the result of an XOR operation on the bit of same rank of the remainder of the second division, and on the bit of same rank of the network sub-address;
   e3) choosing for each bit of rank from p+1 to s of the third intermediary address the bit of same rank of the remainder of the second division; and
   e4) setting the bits of rank from s+1 to q−1 of the third intermediary address to 0, and the bit of rank q of the third intermediary address to 1.

8. The method of claim 4, wherein when the intermediary address associated with the first address is equal to a second address, a flag corresponding to the second address in an address table comprising a flag corresponding to each possible reduced address, is activated,
   the flags of the address table corresponding to each second address associated with a single first address being deactivated.

* * * * *